United States Patent Office 3,651,037
Patented Mar. 21, 1972

3,651,037
PROCESS FOR PREPARING HIGH-SOLIDS CHLOROPRENE POLYMER LATEX
Austin Matthew Snow, Jr., Wilmington, Del., assignor to E. I. du Pont de Nemours and Company, Wilmington, Del.
No Drawing. Continuation-in-part of application Ser. No. 669,720, Sept. 22, 1967. This application Sept. 30, 1969, Ser. No. 862,451
Int. Cl. C08f $3/16$
U.S. Cl. 260—92.3     4 Claims

ABSTRACT OF THE DISCLOSURE

High-solids chloroprene polymer latexes are prepared by polymerizing chloroprene in an alkaline aqueous emulsion containing critical amounts of the potassium salts or a mixture of the sodium and potassium salts of (1) disproportionated wood rosin acids, (2) a formaldehyde condensate of a naphthalene sulfonic acid, and (3) a polymerized unsaturated fatty acid.

CROSS-REFERENCE TO RELATED APPLICATION

This application is a continuation-in-part of my co-pending application Ser. No. 669,720, filed Sept. 22, 1967, now abandoned.

BACKGROUND OF THE INVENTION

For many purposes it is desirable to use a chloroprene polymer latex containing a relatively high content of polymer. Such latexes are usually referred to as "high-solids" latexes. The most practical method heretofore used for the preparation of high-solids chloroprene polymer latexes has been a multiple-step procedure wherein a polychloroprene latex is first prepared and then is concentrated by a "creaming" step, by addition to the latex at 15 to 30° C. of a 1% solution of ammonium alignate containing about 3% lauryl acid sulfate or by the practice dislosed in U.S. Pat. 2,450,724. This multiple-step method has several disadvantages and is usually accompanied by some loss of polymer. A direct polymerization method would avoid the need for a separate operation and have certain other advantages over the creaming procedure, such as producing latexes having lower viscosity and greater colloidal stability.

Unfortunately, most direct methods that have been proposed heretofore for the preparation of high-solids chloroprene polymer latex are not practical for large-scale operations. When water content or soap content of the polymerization system is decreased, severe problems are encountered, such as excessive viscosity or colloidal instability, or both, of the reaction mass or the resulting latex. Furthermore, the problems are complicated by the need to consider possible adverse effects of changes of the polymerization recipe on the final properties of consumer goods prepared from the latexes.

SUMMARY

Now according to the present invention it has been found that the foregoing and related problems of the prior art can be overcome and high-solids chloroprene polymer latexes can be produced by directly polymerizing chloroprene, or a mixture of chloroprene with up to 20% by weight of another copolymerizable organic monomer, in an alkaline aqueous emulsion containing 55 to 90, preferably 55 to 70, parts of water, if there is present in the emulsion, a combination of the potassium or mixed sodium and potassium salts of:

(a) About from 1.3 to 2.5 parts of disproportionated wood rosin (parts based on free acid rosin equivalent),
(b) About from 0.25 to 4.0 parts of a formaldehyde condensate of a naphthalene sulfonic acid (parts based on the salt of the condensation product, and
(c) About from 0.15 to 0.5 part of polymerized unsaturated fatty acid, all parts being by weight per 100 parts of monomer, provided also that the maximum and minimum amounts of formaldehyde condensate (b), in parts by weight of the salt per hundred parts of monomer, are within the limits of $W_D$ (max.) and $W_D$ (min.) in the following equations:

$$W_D \text{ (max.)} = (0.01823C + .01092W - 1.413) \text{ times}$$

$$\left( \frac{-.4282 W_S{}^2 - .7429 W_S W_E - .2864 W_E{}^2 + .5913 W_S - 2.244 W_E}{.1976 W_S + .2286 W_E - 1} \right)$$

$$W_D \text{ (min.)} = (.01823C + .01092W - 1.413) \text{ times}$$

$$\left( \frac{-.5273 W_S{}^2 - .9148 W_S W_E - .3527 W_E{}^2 + 1.0934 W_S - 1.4421 W_E}{.2815 W_E + .2434 W_S - 1} \right)$$

where $W_S$ = parts of disproportionated wood rosin per 100 parts of monomer
$W_E$ = parts of polymerized unsaturated fatty acid per 100 parts of monomer
$W$ = parts of water per 100 parts of monomer
$C$ = percent conversion of monomer.

Values calculated for $W_D$ above 3.0 or below 0.25, or negative values, represent proportions of these components outside the scope of this invention.

DESCRIPTION OF THE PREFERRED EMBODIMENTS

The solids content of latexes prepared by processes of this invention will vary somewhat with the conversion of the monomer during the polymerization. Usually the solids will range from 50% to 65%. "Solids" refers to the total solids of the latex. A method of determining solids content is illustrated in the examples.

In the processes of this invention, chloroprene can be polymerized alone, or up to about 20% by weight of the chloroprene can be replaced by another copolymerizable monomer. Examples of suitable copolymerizable monomers include vinyl-substituted aromatic compounds, such as styrene, vinyltoluenes, and vinylnaphthalenes; acrylic and methacrylic nitriles; and conjugated diolefinic compounds such as 1,3-butadiene, isoprene, and 2,3 dichloro-1,3-butadiene. The properties of the final polymer can be altered by polymerizing in the presence of one or more of the well-known "modifying agents" such as sulfur, alkyl mercaptans, iodoform, and dialkyl xanthogen disulfides.

The polymerization is carried out using well-known emulsion polymerization techniques. To prepare a latex having a high content of polymer, the amount of water used is about 55 to 90 parts by weight per 100 parts of monomer. Conventional polymerization initiators of the free radical type are used. These include compounds containing the peroxy radical such as hydrogen peroxide, cumene hydroperoxide and water-soluble salts of persulfuric acid. The polymerization can be carried out between 35° C. and 60° C., preferably between 40 and 55° C. With the particular emulsifying composition of this invention, the pH should be on the alkaline side, and should be at least about 10.5 and preferably about 13.

The percent monomer conversion is 85% or higher for latexes of this invention. If desired, volatile components can be removed after polymerization by steam stripping, for example at 60° C. and 150 mm. absolute pressure, and flashing off additional water from the stripped latex by subjecting it to 20–25 mm. absolute pressure or as described in U.S. Pat. 2,467,769.

The wood rosins used are the disproportionated wood rosins of commerce having acid numbers of about 160 to 180. The rosins are neutralized in the emulsion to the potassium or mixed potassium and sodium salts. Disproportionated wood rosins consist of rosin in which the unsaturated ingredients have been compensatingly hydrogenated and dehydrogenated to saturated and aromatic compounds.

Preparation of disproportionated rosins which can be utilized in practicing the present invention is disclosed in U.S. Pats. 2,154,629 and 2,201,237.

The polymerized unsaturated fatty acids are also commercially available materials. They are derived from acyclic, aliphatic polyunsaturated carboxylic acids, preferably containing 16 to 18 carbon atoms. Of these, linoleic acid is the best known example. The commercially available materials usually are mixtures of dimeric and trimeric materials containing a small amount of the monomer. A discussion of polymerized unsaturated fatty acids is found in column 2 of U.S. Pat. 2,876,203.

The condensation products of formaldehyde and a naphthalenesulfonic acid are likewise well-known materials. The naphthalene ring may be substituted with one or more lower alkyl groups. Such compounds are disclosed, for example, in U.S. Pat. 1,336,759. A discussion of compounds of this type appears also in Schwartz and Perry, Surface Active Agents, 1949, p. 119.

The amounts of the three components of the emulsifying composition are critical with respect to two criteria. One is the maximum viscosity of the latex during polymerization and the other the colloidal stability of both the polymerizing emulsion and the finished latex.

If the latex becomes too viscous during polymerization it is impossible to control the reaction because of difficulty of stirring and consequent lack of adequate heat removal. While the upper permissible value of viscosity may vary somewhat for individual commercial facilities, a practical limit may be set at 600 centipoises, determined at the polymerization temperature.

If the polymerizing emulsion is not colloidally stable, polymer will coagulate, thereby reducing the solids content of the latex and, in addition, causing fouling of the equipment. Both are objectionable and lead to higher cost of manufacture.

The amounts of the three components of the emulsifying composition must be properly chosen to avoid sedimentation, another type of colloidal instability encountered in the finished latex. When latex showing sedimentation is allowed to stand, the solids content of the latex becomes non-uniform due to a settling of latex particles under the influence of gravity. The phenomenon is called sedimentation (or stratification, if a sharp line of demarcation is clearly evident) and is easily detected by determining the percentage of solids at different levels in the sample. Although the sedimented particles can be easily redispersed by simple stirring, this behavior is highly objectionable in some end-use applications, as for instance those involving processes where a stream of latex is metered from an unstirred tank.

At least 1.3 part of the disproportionated wood rosin per 100 parts of monomer (parts based on free acid rosin equivalent) must be present to give, on neutralization, a soap forming sufficient micelles for the polymerization to proceed. If more than 2.5 parts of the rosin is used, the maximum viscosity during polymerization will become too high for the process to be practical unless excessive amounts of naphthalene sulfonic acid-formaldehyde are added. The preferred amount is about 1.5 to 2.0.

From 0.25 to 3.0 parts of the salt of the naphthalenesulfonic acid-formaldehyde condensate is required to provide optimum colloidal stability, particularly with respect to avoiding formation of coagulum during the polymerization process, and also to keep the viscosity of the polymerizing emulsion within acceptable limits; the preferred range is 0.5 to two parts. More than 3.0 parts is wasteful and an impractically large amount of this ingredient.

At least 0.15 part of the polymerized fatty acid is used to provide a latex having adequate colloidal stability during polymerization and storage. More than 0.5 part leads to excessive polymerization viscosity unless excessive amounts of the formaldehyde condensate are added. The preferred range is 0.15 to 0.3 part per 100 parts of monomer. The potassium salts are preferred since their use ensures good emulsion stability and minimum peak viscosity during polymerization. However, as much as about 50% of the potassium ion may be replaced by sodium ion with satisfactory results, but amounts that cause precipitation of the polymerized fatty acid should be avoided.

In addition to the foregoing limitations, the formula for maximum and minimum amounts of naphthalene sulfonic acid-formaldehyde condensate rigidly controls the amounts of the three surfactants required to obtain a viscosity resulting in good heat transfer and obtaining good colloidal stability in regard to coagulation and sedimentation.

To ensure maximum stability during aging, additional emulsifying agents and pH regulators, such as rosin salt, additional polymerized fatty acid salt, and diethanolamine may be added to the latex after polymerization. This is not essential.

The latexes prepared in accordance with this invention are highly useful materials. Representative uses are for saturation of cellulosic materials, and for the preparation of dipped goods and latex foam articles.

Examples

The invention will be better understood by reference to the following illustrative examples:

In the examples, chloroprene is polymerized in an aqueous emulsion under a nitrogen atmosphere. During the polymerization, Brookfield viscosities of samples are measured at polymerization temperature using a No. 2 spindle at 60 r.p.m.

The amount of coagulum present is determined by straining the latex through a double thickness of cheesecloth. As much water as possible is pressed out manually and the wet sample is weighed. Percent coagulum is based on the weight of the monomer charged.

The solids content of the latex is calculated by evaporating off water and other volatile materials from a weighed sample at 100° C. The residue is weighed and percent solids is based on the weight of the original latex sample.

All parts are by weight unless otherwise stated.

EXAMPLE 1

Chloroprene solution (A) and aqueous solution (B) are emulsified:

(A) Chloroprene solution

| | Parts by weight |
|---|---|
| Chloroprene | 100.0 |
| Dodecyl mercaptan | 0.1 |
| Dimerized linoleic acid [a] | 0.32 |
| Disproportionated wood rosin [b] | 1.9 |
| 4-tertiary-butylcatechol, 90% | 0.0075 |

Footnotes appear at bottom of Example 1 in Column 5.

(B) Aqueous solution

| | |
|---|---:|
| Distilled water | 57.0 |
| Potassium salt of condensate of formaldehyde and alkyl naphthalene sulfuric acid [c] | 2.0 |
| Potassium hydroxide | 1.1 |
| Dextrose | 0.1 |
| Potassium sulfite | 0.1 |

Polymerization is carried out in a nitrogen atmosphere at 45° C. during about 6-hours by the addition, as required, of 4 parts of a solution containing 2.5% by weight of potassium persulfate and 0.06% by weight of sodium 2-anthraquinonesulfonate to take the specific gravity to 1.116 at polymerization temperature. At this point the polymerization is stopped by adding 0.02 part of 2,5-di-tertiary-butylhydroquinone and 0.02 part phenothiazine, as a toluene emulsion containing 1% of each. The toluene emulsion is prepared by emulsifying 1 part phenothiazine, 1 part of the butyl hydroquinone, 1 part sodium methylene bis naphthalene sulfonate [d] in 64 parts by weight of toluene and 30 parts by weight of water until a smooth emulsion is obtained and then adding one part of technical lauryl acid sulfate (active ingredient basis).[e]

After 5 to 10 minutes 2.82 parts of potassium salt of disproportionated wood rosin [f] and 3.33 parts of 30% aqueous diethanolamine is added. The conversion is 90.4% based on solids analysis. The highest viscosity during polymerization is 269 centipoises. Solids content is 56.8%. No coagulum is obtained. Unreacted chloroprene is removed by steam stripping at 60° C. and 150 mm. absolute pressure, and flashing off additional water from the warm latex in a subsequent still at 25° C. and 20–25 mm. absolute pressure, giving a latex having 60.3% solids.

Storage of the latex for 7 days showed no colloidal instability and no sedimentation (less than 0.1% variation in solids content from top to bottom).

FOOTNOTES TO EXAMPLE 1

[a] Essentially a C₃₆ dibasic acid resulting from the polymerization of linoleic acid. The dimer content is about 75%, the trimer content is about 22%, and the monomer content is about 3%. It is commercially available as "Empol 1022" from Emery Industries, Inc.

[b] Disproportionated wood rosin, obtainable from Hercules, Inc. as Rosin 731 SK, which has been partially neutralized with potassiu carbonate and has an acid number of 157. 1.9 parts of this rosin is equivalent to 1.76 parts of free acid rosin.

[c] The material used is "Daxad 11 KLS" supplied by W. R. Grace and Co. It is the potassium salt of the condensate of formaldehyde and alkylnaphthalenesulfonic acid; it is stable in the presence of mild acids and alkalies; it has practically no tendency to foam and it has a pH (1% sol. at 72° F.) of 7 to 8.5. Parts are based on the active ingredient.

[d] The material used was "Lomar" PW, available from Nopco Chemical Co.

[e] The material used was "Duponol" WAQ, sold by Du Pont.

[f] The material used was "Dresinate" 91, sold by Hercules, Inc.

EXAMPLE 2

A latex is prepared by polymerizing chloroprene to complete conversion at 45° C. in an aqueous emulsion using the following recipe:

| | Parts by weight |
|---|---:|
| Chloroprene | 100 |
| Dodecyl mercaptan | 0.2 |
| Disproportionated rosin [a] | 1.8 |
| Dimerized linoleic acid (same as in Ex. 1) | 0.15 |
| Potassium salt of condensate of formaldehyde and alkylnaphthalenesulfonic acid (same as in Ex. 1) | 1.5 |
| Water | 60 |
| Potassium hydroxide | 1.1 |

[a] The disproportionated rosin used has been partially neutralized with sodium carbonate so that it has an acid number of about 140. It is commercially available from Hercules, Inc. as Resin 731–SA. 1.8 parts of this rosin is equivalent to 1.76 parts of free acid rosin equivalent.

To safeguard against spontaneous polymerization, a trace of phenothiazine and 4-tert-butylcatechol (about 0.0025 part of each) is added before polymerization.

The catalyst solution is an aqueous solution containing 1% of potassium persulfate and 0.125% sodium 2-anthraquinonesulfonate. After polymerization the following solution is added to the latex.

| | Parts |
|---|---:|
| Water | 2.33 |
| Diethanolamine | 1.0 |
| Dimerized linoleic acid (same as in Ex. 1) | 0.15 |
| Potassium salt of processed wood rosin (same as in Ex. 1) | 2.2 |

The peak viscosity observed during polymerization is 74 centipoises. The solids content of the latex is 61.7%. No coagulum is obtained.

At the end of a week the latex is found to have remained colloidally stable.

EXAMPLE 3

A latex is prepared using the following recipe and carrying conversion to 100% completion.

| | Parts by weight |
|---|---:|
| Chloroprene | 89.2 |
| 2,3-dichloro-1,3-butadiene | 10.8 |
| Dodecyl mercaptan | 0.48 |
| Disproportionated rosin (same as in Ex. 2) | 1.8 |
| Dimerized fatty acid (same as in Ex. 1) | 0.15 |
| Potassium salt of condensate of formaldehyde and alkylnaphthalenesulfonic acid (same as in Ex. 1) | 1.5 |
| Water | 60 |
| Potassium hydroxide | 1.1 |

Polymerization is carried out at 40° C. using as catalyst an aqueous solution containing 5% potassium persulfate and 0.125% sodium 2-anthraquinonesulfonate.

The peak viscosity observed during the polymerization is less than 100 centipoises. The solids content is about 62%. No coagulum is obtained.

When the latex is observed after a period of six weeks it is found to be colloidally stable.

EXAMPLE 4

Several latexes are prepared by polymerizing chloroprene at 45° C. using the following recipe:

| | Parts by weight |
|---|---:|
| Chloroprene | 100 |
| Dodecyl mercaptan | 0.10 |
| Disproportionated rosin [a] | 1.344 |
| Dimerized linoleic acid (same as used in Ex. 1) | .453 |
| Potassium salt of condensate of formaldehyde and alkylnaphthalenesulfonic acid (same as used in Ex. 1) | ([b]) |
| Water | 57.0 |
| Potassium hydroxide | 1.10 |
| Sodium sulfite | 0.10 |
| Dextrose | 0.10 |

[a] The disproportionated rosin used has an acid number of 167. It is commercially available from Hercules, Inc. as Resin 731–S.

[b] As shown in Table I.

To safeguard against spontaneous polymerization, a trace of phenothiazine and 4-tert-butylcatechol (about .0025 part of each) is added before polymerization.

The catalyst solution is an aqueous solution containing 1% of potassium persulfate and 0.125% sodium 2-anthraquinonesulfonate. These polymerizations are carried to approximately 90% conversion of monomer by taking to a specific gravity at polymerization temperature of The maximum and minimum amounts of naphthalene sulfonic acid-formaldehyde condensate calculated by the formula of this invention for Example 4 are shown below:

$$W_D (max.) = \left[\frac{-.4282(1.344)^2 - .7429(1.344)(.453) - .2864(.453)^2 + .5913(1.344) - 2.244(.453)}{.1976(1.344) + .2286(.453) - 1}\right] \text{ times}$$

$$[.01823(90) + .01092(57) - 1.413]$$

$$= [-.7735 - .4523 - .0588 + .7947 - 1.0165](.85) = \frac{-1.5064}{-.6308}(.85) = 2.03$$

$$W_D (min.) = \left[\frac{-.5273(1.344)^2 - .9148(1.344)(.453) - .3527(.453)^2 + 1.0934(1.344) - 1.4421(.453)}{.2815(.453) + .2434(1.344) - 1}\right] \text{ times}$$

$$[.01823(90) + .01092(57) - 1.413]$$

$$= \left[\frac{-.9525 - .5570 - .0724 + 1.4695 - .6533}{.1275 + .3271 - 1}\right](.85)$$

$$= \frac{-.7657}{-.5454}(.85) = 1.19$$

1.118. The actual conversion is calculated from percent solids of the latex after the polymerization is shortstopped. The polymerizations are shortstopped with 2.0 parts an emulsion of the following composition:

| | Parts by weight |
|---|---|
| Water | 90 |
| Technical lauryl acid sulfate * | 3 |
| Sodium methylene bis naphthalene sulfonate * | 2.6 |
| Toluene | 192 |
| Phenothiazine | 3 |
| Para-tert.-butylcatechol | 3 |

*As used in Example 1; parts based on active ingredient.

After polymerization the following solution is added to the latex:

| | Parts by weight |
|---|---|
| Water | 2.03 |
| Diethanolamine | 1.00 |
| Dimerized linoleic acid (same as in Ex. 1) | 0.125 |
| Potassium salt of processed wood rosin (same as used in Ex. 1) | 2.20 |

$$W_D (max.) = (.01823C + .01092W - 1.413) \text{ times } \left(\frac{-.4282W_S^2 - .7429W_SW_E - .2864W_E^2 + .5913W_S - 2.244W_E}{.1976W_S + .2286W_E - 1}\right)$$

$$W_D (min.) = (.01823C + .01092W - 1.413) \text{ times } \left(\frac{-.5273W_S^2 - .9148W_SW_E - .3527W_E^2 + 1.0934W_S - 1.4421W_E}{.2815W_E + .2434W_S - 1}\right)$$

Unpolymerized chloroprene is removed by distillation under reduced pressure as in Example 1.

Polymerization peak viscosities and colloidal stability of the various latexes are shown in Table I.

TABLE I

| Example 4 | A | B | C | D |
|---|---|---|---|---|
| Potassium salt of condensate of formaldehyde and alkyl-naphthalene sulfonic acid, parts based on active ingredient | .88 | 1.40 | 1.93 | 2.64 |
| Coagulum, percent based on monomer | .23 | .08 | .02 | .01 |
| Peak viscosity, cps | 928 | 536 | 280 | 136 |
| Sedimentation | No | No | No | Yes |
| Percent solids after stripping | 55.7 | 53.4 | 51.9 | 54.4 |

This series shows the criticality of the amount of salt of formaldehyde-alkyl naphthalene sulfonic acid condensate. Example A, using less than the minimum amount called for by the formula, has a viscosity of 928 centipoises, too high to be practical. Examples B and C, within the limits specified by the formula are satisfactory. Example D exhibited sedimentation.

I claim:

1. In a process for directly polymerizing chloroprene containing up to 20% by weight of another ethylenically unsaturated organic monomer copolymerizable therewith, to at least 50% solids in an alkaline aqueous emulsion containing 55 to 90 parts of water, the improvement which comprises having present in the emulsion the potassium or mixed sodium and potassium salts of:
   (a) about from 1.3 to 2.5 parts of disproportionated wood rosin (parts based on free acid rosin equivalent,
   (b) About from 0.25 to 3.0 parts of a formaldehyde condensate of a naphthalene sulfonic acid, said parts being based on the salt of the condensation product, and
   (c) about from 0.15 to 0.5 parts of polymerized unsaturated fatty acid,
   all parts being by weight per 100 parts of monomer, and provided also that the maximum and minimum amounts of the formaldehyde condensate (b), in parts by weight of the salt per 100 parts of monomer, are within the limits of $W_D$ (max.) and $W_D$ (min.) in the following equations:

$$W_D (max.) = (.01823C + .01092W - 1.413) \text{ times } \left(\frac{-.4282W_S^2 - .7429W_SW_E - .2864W_E^2 + .5913W_S - 2.244W_E}{.1976W_S + .2286W_E - 1}\right)$$

$$W_D (min.) = (.01823C + .01092W - 1.413) \text{ times } \left(\frac{-.5273W_S^2 - .9148W_SW_E - .3527W_E^2 + 1.0934W_S - 1.4421W_E}{.2815W_E + .2434W_S - 1}\right)$$

where, per 100 parts of monomer,
$W_S$ = parts of disproportionated wood rosin,
$W_E$ = parts of polymerized unsaturated fatty acid,
$W$ = parts of water, and
$C$ = percent conversion of monomer.

2. A process of claim 1 wherein the percentage of monomer conversion in the polymerization is at least 85%.

3. A process of claim 1 wherein the latex produced has a total solids of about from 50 to 65% by weight.

4. A process of claim 1 wherein the polymerization temperature is in the range of from 35 to 60° C.

References Cited

UNITED STATES PATENTS

| 3,190,865 | 6/1965 | Miller | 260—92.3 |
| 3,317,451 | 5/1967 | Apotheker | 260—29.7 |
| 3,392,134 | 7/1968 | Apotheker | 260—29.7 |
| 3,472,828 | 10/1969 | Montgomery | 260—92.3 |
| 3,498,935 | 3/1970 | Noble | 260—2.5 |

JOSEPH L. SCHOFER, Primary Examiner

C. A. HENDERSON, JR., Assistant Examiner

U.S. Cl. X.R.

260—23.7 H, 23.7 A, 27 BB, 29.7 SO